US008444514B2

(12) United States Patent
Nankou

(10) Patent No.: US 8,444,514 B2
(45) Date of Patent: May 21, 2013

(54) FRONT DERAILLEUR CHAIN DETACHMENT PREVENTION MEMBER

(75) Inventor: Yoshiaki Nankou, Sakai (JP)

(73) Assignee: Shimano Inc., Osaka (JP)

( * ) Notice: Subject to any disclaimer, the term of this patent is extended or adjusted under 35 U.S.C. 154(b) by 1893 days.

(21) Appl. No.: 11/448,017

(22) Filed: Jun. 7, 2006

(65) Prior Publication Data

US 2007/0060427 A1 Mar. 15, 2007

(30) Foreign Application Priority Data

Sep. 12, 2005 (JP) ................................ 2005-264125

(51) Int. Cl.
*F16H 57/12* (2006.01)

(52) U.S. Cl.
USPC .......................................................... 474/82

(58) Field of Classification Search
USPC ..................................................... 474/80–82
See application file for complete search history.

(56) References Cited

U.S. PATENT DOCUMENTS

| 4,237,743 | A | * | 12/1980 | Nagano | 474/82 |
| 4,479,787 | A | * | 10/1984 | Bonnard | 474/82 |
| 4,516,961 | A | * | 5/1985 | Coue | 474/80 |
| 4,529,395 | A | * | 7/1985 | Coue | 474/82 |
| 4,543,078 | A | * | 9/1985 | Coue | 474/82 |
| 4,604,078 | A | * | 8/1986 | Nagano | 474/80 |
| 4,613,319 | A | * | 9/1986 | Nagano | 474/80 |
| 6,641,494 | B1 | | 11/2003 | Campagnolo | |

FOREIGN PATENT DOCUMENTS

| FR | 2-518-042 | 12/1981 |
| FR | 2 621 968 A3 | 4/1989 |
| JP | 52-99534 | 8/1977 |
| JP | 57-182581 | 11/1982 |
| JP | 1-141192 | 9/1989 |
| JP | 04-372488 | 12/1992 |
| JP | 2001-080568 | 3/2001 |
| JP | 2002-145164 | 5/2002 |

OTHER PUBLICATIONS

Translation of Coue (FR 2,518,042).*

* cited by examiner

*Primary Examiner* — Robert A Siconolfi
*Assistant Examiner* — Stephen Bowes
(74) *Attorney, Agent, or Firm* — Global IP Counselors

(57) ABSTRACT

A front derailleur chain detachment prevention member is provided that can be easily removed from a front derailleur. The front derailleur chain detachment prevention member is removably mounted on a front derailleur, and has elasticity. The front derailleur chain detachment prevention member is provided with a mounting part, a connecting part, and a regulating part. The mounting part is removably attached to an inner plate of a chain guide. The connecting part extends forward from the mounting part along the inner plate. The regulating part is disposed at a tip of the connecting part, and projects from the inner plate toward an outer plate of the front derailleur.

19 Claims, 7 Drawing Sheets

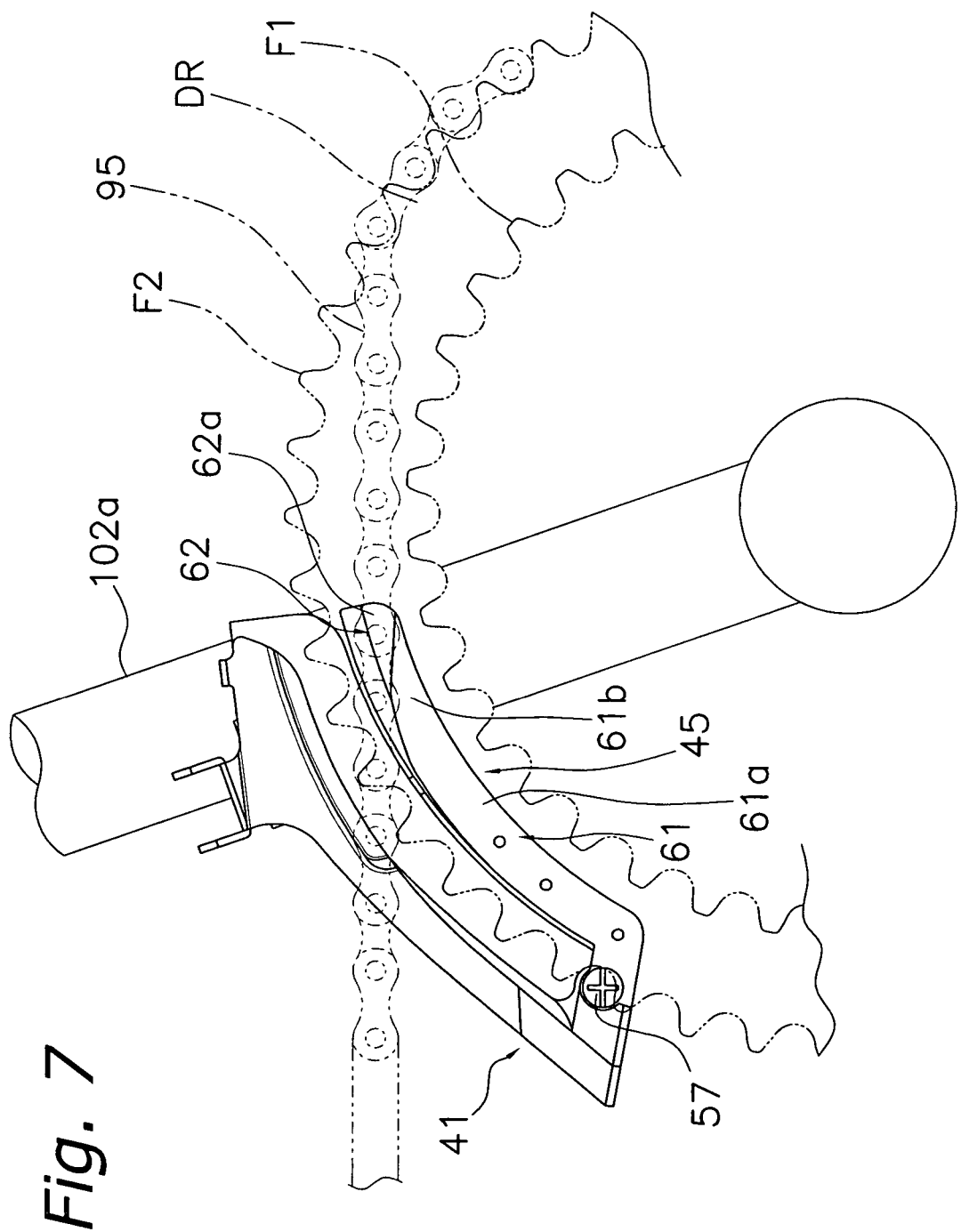

FRONT DERAILLEUR CHAIN DETACHMENT PREVENTION MEMBER

CROSS-REFERENCE TO RELATED APPLICATIONS

This application claim priority under 35 U.S.C. §119 to Japanese Patent Application No. 2005-264125. The entire disclosure of Japanese Patent Application No. 2005-264125 is hereby incorporated herein by reference.

BACKGROUND OF THE INVENTION

1. Field of the Invention

This invention generally relates to a front derailleur chain detachment prevention member. More specifically, the present invention relates to a front derailleur chain detachment prevention member that is installable on the transmission device of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle drive train.

Bicycles, and particularly sport type bicycles, use chain driven types of drive trains with a front transmission device including a front derailleur and front chain wheel with two or three sprockets, and a rear transmission device including a rear derailleur and multi-stage gears with seven to ten sprockets. In the front derailleur of this type of drive train, the chain may not engage the sprocket on the small diameter side so as to detach on the inside when downshifting as the chain is guided from the sprocket on the large diameter side to the sprocket on the small diameter side. Conventional front derailleurs are known to have a front derailleur chain detachment prevention member for preventing the chain from detaching on the inside (for example, refer to Japanese Laid-Open Patent No. 55-10427).

A conventional front derailleur chain detachment prevention member is disposed on the inside of an inner plate of a chain guide for a front derailleur, and is installed on the link shaft of a linkage mechanism. Specifically, two mounting parts are disposed on the inside of the inner plate, and both of the mounting parts and the inner plate are installed together on the link shaft of a linkage mechanism so as to reciprocate between a top shift position and a low shift position.

The front derailleur chain detachment prevention member must be replaced according to the number of teeth of the sprocket. That is, when there is a large difference in the number of gear teeth between the large diameter sprocket and the small diameter sprocket, a member with a large dimension in the diameter direction must be installed to prevent chain detachment. In a conventional structure, however, the entire front derailleur must be disassembled when intending to remove the front derailleur chain detachment prevention member since the mounting parts are installed on the link shaft of a linkage mechanism. Therefore, the front derailleur chain detachment prevention member can not be removed easily.

Furthermore, in a conventional structure, the front derailleur chain detachment prevention member may come into contact with the small diameter sprocket when the front derailleur chain detachment prevention member is disposed at the high-speed position opposite the large diameter sprocket. When the front derailleur chain detachment prevention member comes into contact with the sprocket, the small diameter sprocket and the front derailleur chain detachment prevention member are subject to wear, and a contact-induced abnormal noise is generated.

In view of the above, it will be apparent to those skilled in the art from this disclosure that there exists a need for an improved front derailleur chain detachment prevention member. This invention addresses this need in the art as well as other needs, which will become apparent to those skilled in the art from this disclosure.

SUMMARY OF THE INVENTION

One object of the present invention is to provide a front derailleur chain detachment prevention member that is easily removable from the front derailleur.

Another object of the present invention is to provide a front derailleur chain detachment prevention member that is unlikely to come into contact with the sprocket.

In accordance with a first aspect of the present invention, the foregoing objects can basically be attained by providing a front derailleur chain detachment prevention member that includes a mounting part, a connecting part and a regulating part. The mounting part is configured and arranged to be detachable and reinstallable to an inner plate of a chain guide of a front derailleur. The connecting part has a rearward end coupled to the mounting part and a forward end located forwardly from the mounting part such that the connecting part extends along the inner plate with a tip of the forward end being cantilevered relative to the mounting part when installed on the chain guide of the front derailleur to be resiliently supported. The regulating part is disposed at the tip of the forward end of the connecting part and projecting from the inner plate toward an outer plate of the chain guide when installed on the chain guide of the front derailleur.

When this front derailleur chain detachment prevention member is installed on the transmission device, the mounting part is mounted on the inner plate. Thus, the connecting part is disposed so as to extend from the mounting part and extend forward along the inner plate, and the regulating part is disposed at the extended tip end. The regulating member can freely move in a direction away from the chain since the regulating member is disposed so as to project toward the outer plate from the inner plate and is not mounted on the inner plate. Furthermore, the entirety of the front derailleur chain detachment prevention member has elasticity. When the front derailleur chain detachment prevention member is mounted on the inner plated and moves from the sprocket on the large diameter side toward the sprocket on the small diameter side, the chain derails from the sprocket on the large diameter side and transfers to the sprocket on the small diameter side while in contact with the regulating member projecting toward the outer plate. Thus, chain detachment can be prevented. During the movement from the sprocket on the small diameter side to the sprocket on the large diameter side, the regulating member moves to the inside when the chain is transferring to the sprocket on the large diameter side since the connecting member is disposed along the inner plate, and the regulating member returns to its original position via its elasticity when the chain transfers to the sprocket on the large diameter side. In this case, since the mounting part of the front derailleur chain detachment prevention member is removably installed on the inner plate, the front derailleur chain detachment prevention member can be easily removed from the inner plate, which is part of the transmission device, when replacing the front derailleur chain detachment prevention member for another of different shape in accordance with the difference in the number of gear teeth.

A front derailleur chain detachment prevention member of a second aspect of the present invention is a front derailleur chain detachment prevention member according to the first aspect of the present invention, wherein each of the mounting part, the connecting part, and the regulating part includes a synthetic resin chain contacting part having a low coefficient of friction relative to metal. In this case, the chain is not damaged nor produces anomalous noise even when the chain comes into contact with the connecting member and regulating member.

A front derailleur chain detachment prevention member of a third aspect of the present invention is a front derailleur chain detachment prevention member according to the first or second aspect of the present invention, wherein the connecting part is configured and arranged to be disposed along a bottom edge of the inner plate such that the connecting part is disposed outward in a radial direction from an outermost diameter position of a smallest stage sprocket on a small diameter side when installed on the chain guide of the front derailleur with a chain receiving slot of the front derailleur being disposed over a largest stage sprocket on a large diameter side. In this case, since the connecting member disposed along the bottom edge of the inner plate, parts of the front derailleur chain detachment prevention member other than the regulating member are disposed on the same surface relative to the inner plate, or at a position separated farther from the outer plate. Also the bottom edge of the connecting member is disposed outward in a radial direction from an outermost diameter position of a smallest stage sprocket on a small diameter side even when the chain guide is disposed at the sprocket on the small diameter side. Therefore, the front derailleur chain detachment prevention member does not come into contact with the sprocket on the small diameter side even when the chain guide is disposed at the sprocket on the large diameter side.

A front derailleur chain detachment prevention member of a fourth aspect of the present invention is a front derailleur chain detachment prevention member according to the first through third aspects of the present invention, wherein a force exerting member configured and arranged as an elastic body that exerts a force on the regulating part toward the outer plate. In this case, the force exerted by the force exerting member can be set in accordance with the force from the chain to increase the force exerted on the front derailleur chain detachment prevention member by the force exerting member.

A front derailleur chain detachment prevention member of a fifth aspect of the present invention is a front derailleur chain detachment prevention member according to the fourth aspect of the present invention, wherein force exerting member is a flat spring. In this case, the regulating member can exert a force by means of a force exerting member of a simple structure.

The front derailleur chain detachment prevention member of a sixth invention provides, in the member of any of the first through fifth aspects, that the mounting member is disposed backward from the regulating member when installed on the chain guide. In this case, the regulating member reliably contacts the chain at the front part of the inner plate since the mounting part is disposed forward from the regulating member.

A front derailleur chain detachment prevention member of a seventh aspect of the present invention is a front derailleur chain detachment prevention member according to the first through sixth aspects of the present invention, wherein a contacting part disposed on the connecting part to contact the inner plate. In this case, excessive projection of the regulating part is prevented even in face of the action of the force of the force exerting member and the exerted force itself, insofar as the amount of projection of the regulating member can be limited to a predetermined amount by the contacting member. Therefore, the regulating member is unlikely to come into contact with a sprocket.

A front derailleur chain detachment prevention member of an eighth aspect of the present invention is a front derailleur chain detachment prevention member according to the first through seventh aspects of the present invention, wherein the mounting part includes a connecting bolt that is configured and arranged to fixedly attached to the inner plate and the outer plate together as well as mount the front derailleur chain detachment prevention member to the inner plate. In this case, the front derailleur chain detachment prevention member is not only connected to the outer plate by a connecting bolt, but is also attached to the inner plate. Therefore, separate members for attachment are unnecessary.

A front derailleur chain detachment prevention member of a ninth aspect of the present invention is a front derailleur chain detachment prevention member according to the first through eighth aspects of the present invention, wherein the regulating part has a flat surface disposed substantially parallel to a chain receiving slot defined by the inner and outer plates when the front derailleur chain detachment prevention member is installed on the chain guide of the front derailleur. In this case, chain detachment is more reliably prevented by the larger contact surface area with the lateral surface of the chain.

A front derailleur chain detachment prevention member of a tenth aspect of the present invention is a front derailleur chain detachment prevention member according to the first through eighth aspects of the present invention, wherein the connecting part has a tapered surface that is inclined to slope downwardly and away from a chain receiving slot defined by the inner and outer plates when the front derailleur chain detachment prevention member is installed on the chain guide of the front derailleur. In this case, the chain is smoothly guided when upshifting from the sprocket on the small diameter side to a sprocket on the large diameter side since the bottom part is disposed closer to the inside where the small diameter sprocket is than the top part.

A front derailleur chain detachment prevention member of an eleventh aspect of the present invention is a front derailleur chain detachment prevention member according to the first through eighth aspects of the present invention, wherein the tapered part has a curvature that curves smoothly toward the regulating part. In this case, the chain is smoothly guided from the tapered part even when the chain comes into contact with the connecting part due to the smooth linkage from the concave tapered part to the regulating part.

According to the present invention, since the mounting part of the front derailleur chain detachment prevention member is removably installed on the inner plate at one location, the front derailleur chain detachment prevention member can be easily removed from the inner plate of the front derailleur, when replacing the front derailleur chain detachment prevention member for another of different shape in accordance with the difference in the number of gear teeth.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 shows the chain shifting operation when downshifting in accordance with one embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claim and their equivalents.

Figure 1:
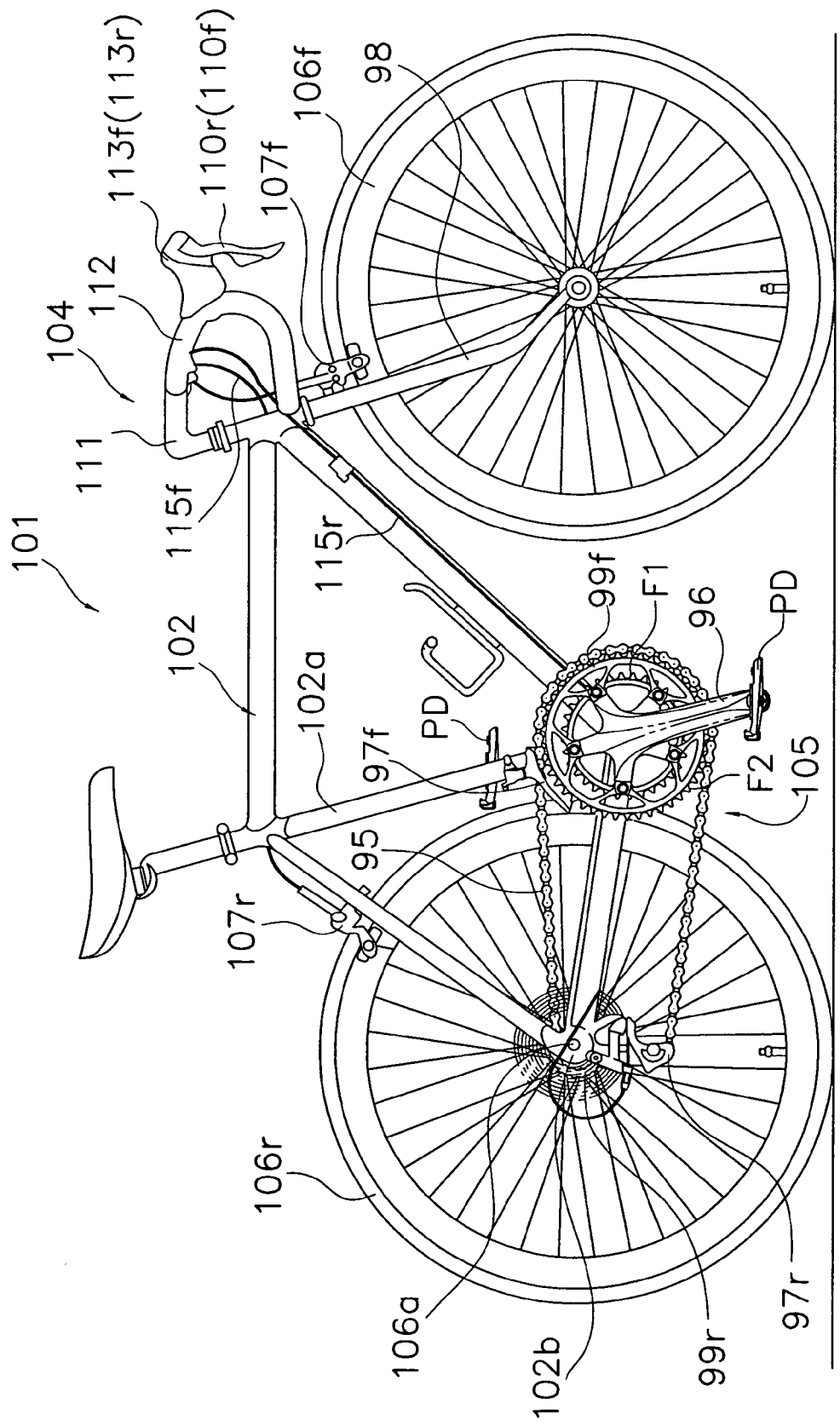
FIG. 1 is a right side elevational view of a bicycle equipped with a front derailleur having a front derailleur chain detachment prevention member in accordance with one embodiment of the present invention.

Referring initially to FIG. 1, a bicycle 101 is illustrated in accordance with a first embodiment of the present invention. As seen in FIG. 1, the bicycle 101 is a "road racer" (racing style road bike) that basically comprises a diamond shaped frame 102, a handlebar unit 104, a drive unit 105, a pair of front and rear wheels 106f and 106r, a pair of front and rear brake devices 107f and 107r and a pair of variable speed gearshift devices or transmission operating devices 110f and 110r. The diamond shaped frame 102 has a front fork 98 to which the handlebar unit 104 is fastened. The drive unit 105 basically includes a chain 95, a crank 96 with a pair of pedals PD, a pair of motorized front and rear derailleurs 97f and 97r, a pair of front and rear sprocket sets 99f and 99r, and other conventional components. The front and rear wheels 106f and 106r are installed on the front fork 98 and the rear side of the frame 102, respectively, as seen in FIG. 1. The speed gearshift devices or transmission operating devices 110f and 110r are operatively coupled to the front and rear derailleurs 97f and 97r by transmission cables 115f and 115r for operating the front and rear derailleurs 97f and 97r.

Figure 2:
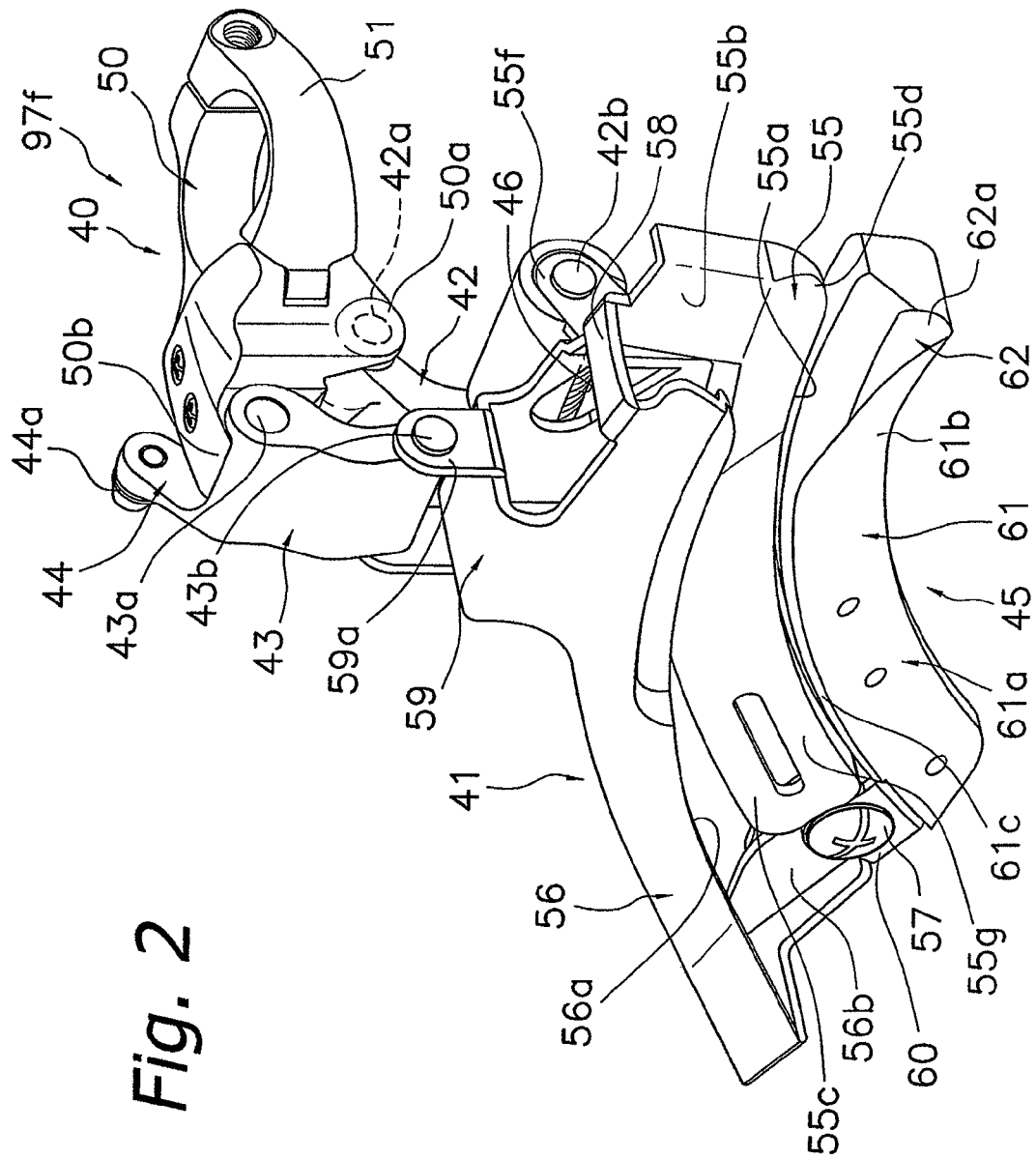
FIG. 2 is a perspective view of the front derailleur with the derailleur chain detachment prevention member in accordance with the illustrated embodiment of the present invention.
Figure 3:
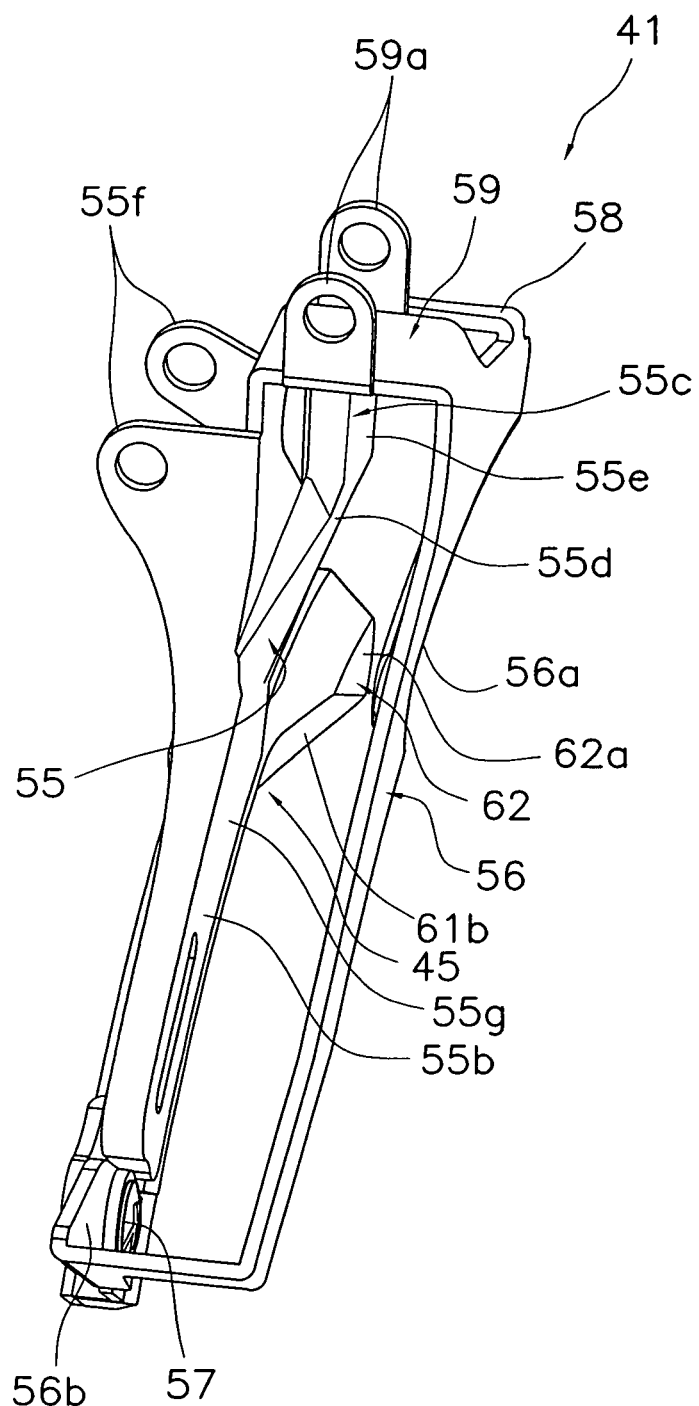
FIG. 3 is a rear perspective view of the back surface of a chain guide and front derailleur chain detachment prevention member in accordance with the illustrated embodiment of the present invention.

As seen in FIG. 2, the handlebar unit 104 includes a handlebar stem 111, and a handlebar 112 fixedly coupled to the upper end of the handlebar stem 111. The handlebar stem 111 is fixedly coupled to an upper end of the front fork 98. The handlebar 112 is a drop handle type handlebar equipped with left and right brake levers 113f and 113r for operating the front and rear brake devices 107f and 107r, respectively. The brake lever 113f is disposed at the right end part of the handlebar 112, and the brake lever 113r is disposed at the left end part when the bicycle 101 is viewed from behind. In the illustrated embodiment, the transmission operating parts 110f and 110r are provided on the brake levers 113f and 113r. The transmission operating parts 110f and 110r are connected to the front and rear derailleurs 97f and 97r via the transmission cables 115f and 115r.

The front derailleur 97f is provided on a seat tube 102a of the frame 102, and guides the chain 95 so as to position the chain at one of two shift positions via the transmission operating part 110f. The rear derailleur 97r is provided on the rear hook part 102b of the frame 102, and guides the chain 95 so as to position the chain at one of ten shift positions via the transmission operating part 105r.

The front sprocket group 99f has two sprockets F1 and F2, which have different numbers of gear teeth, arranged in the axial direction of the crank shaft. The rear sprocket group 99r has ten sprockets, which have different numbers of gear teeth, arranged in the axial direction along a hub shaft 106a of the rear wheel. In the front sprocket group 99f, the inside sprocket F1 has fewer gear teeth than the outside sprocket F2. Furthermore, in the rear sprocket group 99r, the sprockets have fewer gear teeth sequentially from the innermost side, and the top outermost sprocket has the fewest gear teeth. The front and rear derailleurs 97f and 97r move the chain 95 to any among the plurality of sprockets to accomplish the gear shifting operation. The gear shifting operation is accomplished by the transmission operation parts 110f and 110r using the brake levers 113f and 113r.

As shown in FIG. 2, the front derailleur 97f is a down-swing-type derailleur. The front derailleur 97f basically has a base bracket or fixed member 40, a chain guide 41, an inner link 42, an outer link 43 and a front derailleur chain detachment prevention member 45. The fixed member 40 is fixedly mounted on the seat tube 102a. The chain guide 41 is configured to move between a retracted position and an extended position relative to the fixing member 40.

The inner link 42 and the outer link 43 are pivotally coupled at their inner ends to the fixed member 40 and pivotally coupled at their outer ends to the chain guide 41. The inner link 42 and the outer link 43 are arranged so as to be parallel to each other. Thus, the inner and outer links 42 and 43 form a four bar linkage assembly with the fixing member 40 and the chain guide 42 in order to move the chain guide 41 between the retracted position and the extended position. The front derailleur chain detachment prevention member 45 is mounted on the chain guide 41 in a detachable and reinstallable manner.

The fixed member 40 has a first clamping or base member 50 and a second clamping or base member 51. The first and second clamping members 50 and 51 are pivotally coupled together so as to be capable of opening and closing, and enclose the seat tube 102a therebetween. The first clamping member 50 is provided with a pair of inner link supports 50a to pivotally mount the inner link 42 via a link shaft 42a. Furthermore, the first clamping member 50 is provided with an outer link support 50b that is disposed above the inner link supports 50a to pivotally mount the outer link 43 to the first clamping member 50 via a link shaft 43a.

In the present embodiment, the chain guide 41 has an inner plate 55 and an outer plate 56 defining a chain receiving slot therebetween. The outer plate 56 is disposed to the outside of the inner plate 55 relative to the fixing member 40. The chain guide 41 guides the chain 95 to either of the two sprockets F1 and F2 by moving between two shift positions that include a low shift position disposed over the small diameter or inside sprocket F1, and a top shift position disposed over the large diameter or outside sprocket F2. The chain guide 41 is connected to the outer ends of the inner link 42 and the outer link 43 so as to move between the retracted position and the extended position relative to the fixing member 40.

In the present embodiment, the inner plate 55 and the outer plate 56 are formed so as to have a back-bent shape with a predetermined cross section by pressing a thin metal plate. Accordingly, in the present embodiment, both the inner and outer plates 55 and 56 are integrally formed as a one-piece, unitary member from a single metallic sheet material that is bent to form a chain cage with the chain receiving slot. In particular, the rear ends of the inner and outer plates 55 and 56 are linked together at by a connecting bolt 57 at one location at the back part, while the inner and outer plates 55 and 56 are integrally linked together at the front end by a piece of by the metallic sheet material. In particular, the inner and outer plates 55 and 56 are integrally connected in a C-shaped bend at the top part by a front connecting part 58 and a back connecting part 59. The back connecting part 59 has a pair of outer link connecting parts 59a extending upwardly. The outer end of the outer link 43 is pivotally connected to the outer link connecting part 59a via a link shaft 43b.

The inner plate 55 is provided with a pair of inner link connecting parts 55f on its back surface. The inner end of the inner link 42 is pivotally connected to the inner link connecting part 55f via a link shaft 42b. A torsion spring 46 is disposed on the outer circumference of the link shaft 42 as a force exerting member that normally urges the chain guide 41 to the low shift position. The torsion coil spring 46 is covered by a synthetic resin spring cover, and one end of the spring is attached to the inner plate 55, and the other end is attached to the inner link 42.

As shown in FIGS. 2~6, the inner plate 55 is formed in an arc-shape that follows the outer periphery of the sprockets F1 and F2, with the bottom edge of the inner plate 55 being concaved. The bottom edge of the inner plate 55 is formed with a flange that is perpendicularly arranged relative to a main body of the inner plate 55 so as to have high strength. The inner plate 55 is used when the chain 95 is moved from the sprocket F1 to sprocket F2 during an upshift with a force necessary to move from the low position to the top position. When the inner plate 55 is disposed at the outside top position, the bottom edge 55a is disposed to the inner side in the axial direction of the tooth tip of the sprocket F2. The front part 55b of the inner plate 55 projects slightly to the outer side compared to the back part 55c, and the bottom part 55d of the front part 55b is gradually inclined from the top part 55e toward the inner side.

The outer plate 56 is formed in an arc-shape so as to be disposed outwardly from the inner plate 55 in the axial direction. When the outer plate 56 is disposed at the outside top position, a gap of approximately 1~3 mm is formed between the tooth tip of the sprocket F2 and the bottom edge 56a. Therefore, the front derailleur 97f is set on the seat tube 102a so as to form the aforesaid gap. A screw anchor 56b is formed on the back part of the outer plate 56 and disposed at the inside surface of the back part 55c of the inner plate 55 bent in a C-shape. The screw anchor 56b is connected to the inner plate 55 by a connecting bolt 57.

As shown in FIG. 2, when the fixed member 40 is mounted on the seat tube 102a, the inner link 42 is disposed below the fixed member 40, with the ends of the inner link 42 being pivotally connected to the fixed member 40 and the chain guide 41. Thus, the inner end of the inner link 42 is connected between the pair of inner link supports 50a so as to freely pivot. The chain guide 41 is connected to the outer end of the inner link 42 so as to freely pivot.

The outer link 43 is disposed so as to be parallel with the inner link 42 at a position farther from the fixed member 40 than the inner link 42. The ends of the outer link 43 are connected to the outer link support 50b of the fixed member 40 and the chain guide 41 so as to freely pivot. Thus, the outer link 43 is pivotally connected to the outer link support 50b. The outer link 43 has a cable connecting arm 44 that is integrally formed on the link support part separated from the fixed member 40 and extending toward the seat tube 102a. A cable connecting part 44a is provided at the tip extending from the cable connecting part 44 for bolting the inner cable of a transmission cable.

The front derailleur chain detachment prevention member 45 of the illustrated embodiment of the present invention has elasticity throughout. The front derailleur chain detachment prevention member 45 is configured with an overall arc-like curvature. The front derailleur chain detachment prevention member 45 basically has a mounting part 60, a connecting part 61 and a regulating part 62. The mounting part 60 is configured and arranged to be detachable and reinstallable to the inner plate 55 of the chain guide 41 of the front derailleur 97f. The connecting part 61 has a rearward end coupled to the mounting part 60 and a forward end located forwardly from the mounting part 60 such that the connecting part 61 extends along the inner plate 55 with a tip of the forward end being cantilevered relative to the mounting part 60 when installed on the chain guide 41 to be resiliently supported. The connecting part 61 is connected to a rear end of the bottom edge 55a of the inner plate 55 and extends forward from the mounting part 60 along the bottom edge 55a of the inner plate 55 in a cantilevered manner. The regulating part 62 is disposed at the tip of the forward end of the connecting part 61 and projects from the inner plate 55 toward the outer plate 56 of the chain guide 41 when installed on the chain guide 41, as shown in FIGS. 2-6. In this embodiment, the mounting part 60, the connecting part 61 and the regulating part 62 are integrally formed as a one-piece member from a material that is normally rigid and self supporting but with a degree of resiliency that allows the regulating part 62 to be deflected in a direction generally transverse to the movement of the chain 95. For example, the mounting part 60, the connecting part 61 and the regulating part 62 are integrally formed of a hard synthetic resin such as, for example, polyacetal and the like, having an elasticity that allows for very smooth oscillation characteristics. The front derailleur chain detachment prevention member 45 is further provided with a flat spring 63 acting as a force exerting member for exerting a force on the regulating part 62 in the direction of the outer plate 56.

The mounting part 60 is disposed farthest back, and is thin compared to the connecting member 61 and the regulating part 62. The mounting part 60 is attached to the inner plate 55 and the outer plate 56 by the connecting bolt 57 that attaches the outer plate 56 to the inner plate 55. The flat spring 63 and the mounting part 60 are also attached to the inner plate 55 by the connecting bolt 57.

The connecting part 61 is formed with an arc-shaped curvature and is disposed along the bottom edge 55a of the inner plate 55. The bottom edge of the connecting part 61 is dimensioned to be disposed outward in the radial direction from the outermost diameter position of the small diameter sprocket F1 when the chain receiving slot of the chain guide 41 is disposed over the large diameter sprocket F2. The connecting part 61 includes a tapered part 61a with a smoothly curving curvature 61b, a top part 61c, a contacting part 61d and an arc-shaped concavity 61e. The tapered part 61a is inclined over its entire length on the side facing the outer plate 56 such that the tapered surface 61a is inclined to slope downwardly and away from the chain receiving slot defined by the inner and outer plates 55 and 56 when the front derailleur chain detachment prevention member 45 is installed on the chain guide 41. The smoothly curving curvature 61b is formed on the front part of the tapered part 61a toward the regulating member 62. The top part 61c of the outside surface of the connecting part 61 is disposed in substantially the same plane as the outside surface 55g of the back part 55c of the inner plate 55.

Figure 4:
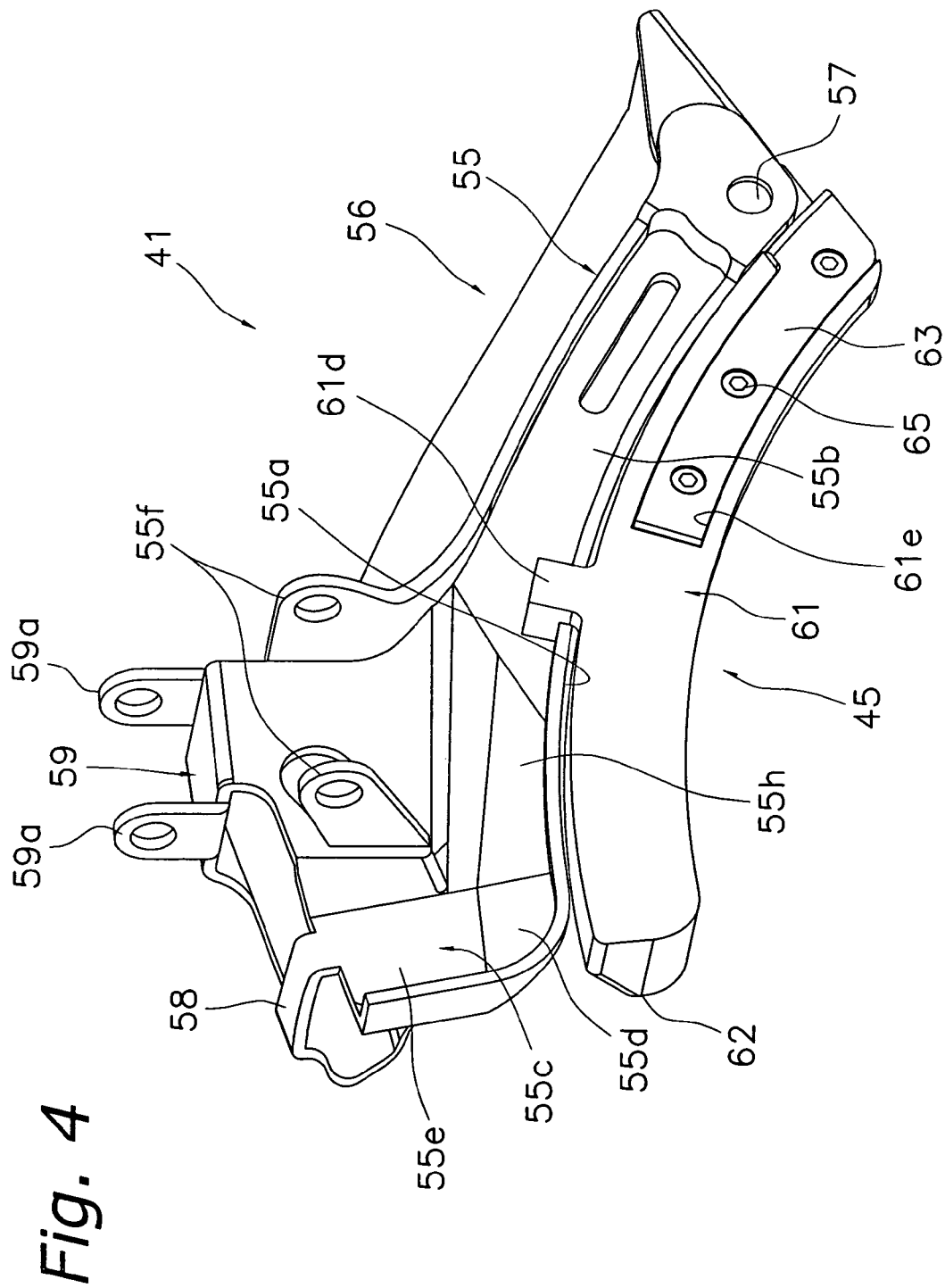
FIG. 4 is an inside perspective view of the side surface of the chain guide and the front derailleur chain detachment prevention member in accordance with the illustrated embodiment of the present invention.
Figure 5:
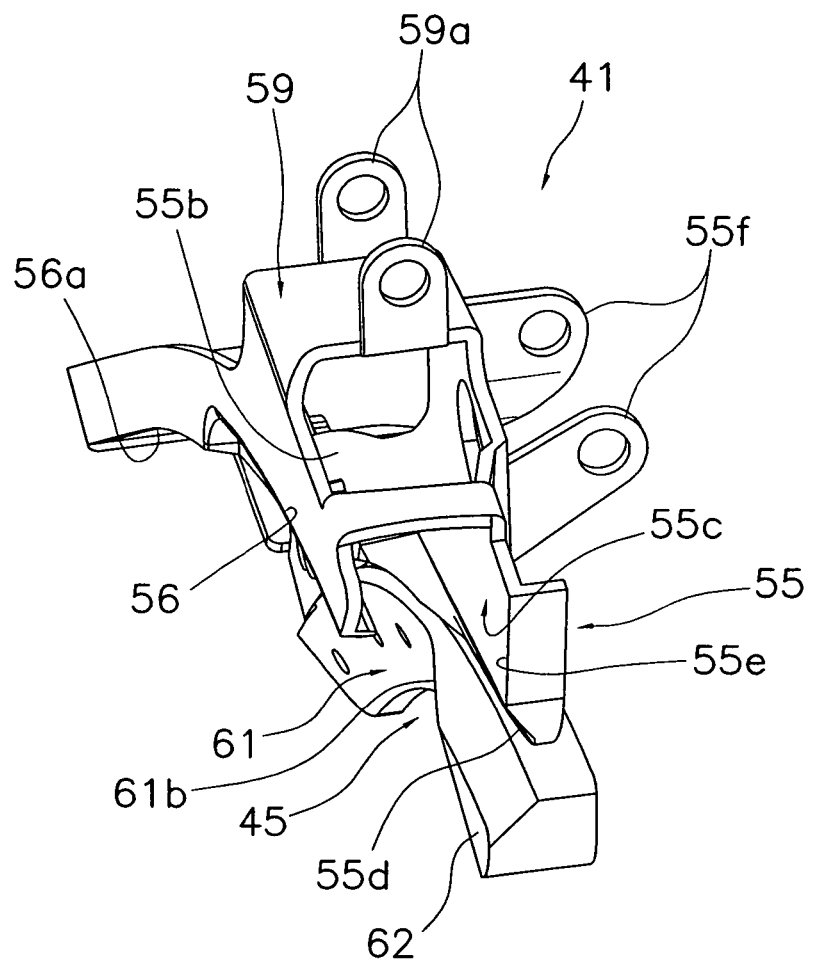
FIG. 5 is a top perspective view of the front surface of a chain guide and the front derailleur chain detachment prevention member in accordance with the illustrated embodiment of the present invention.
Figure 6:
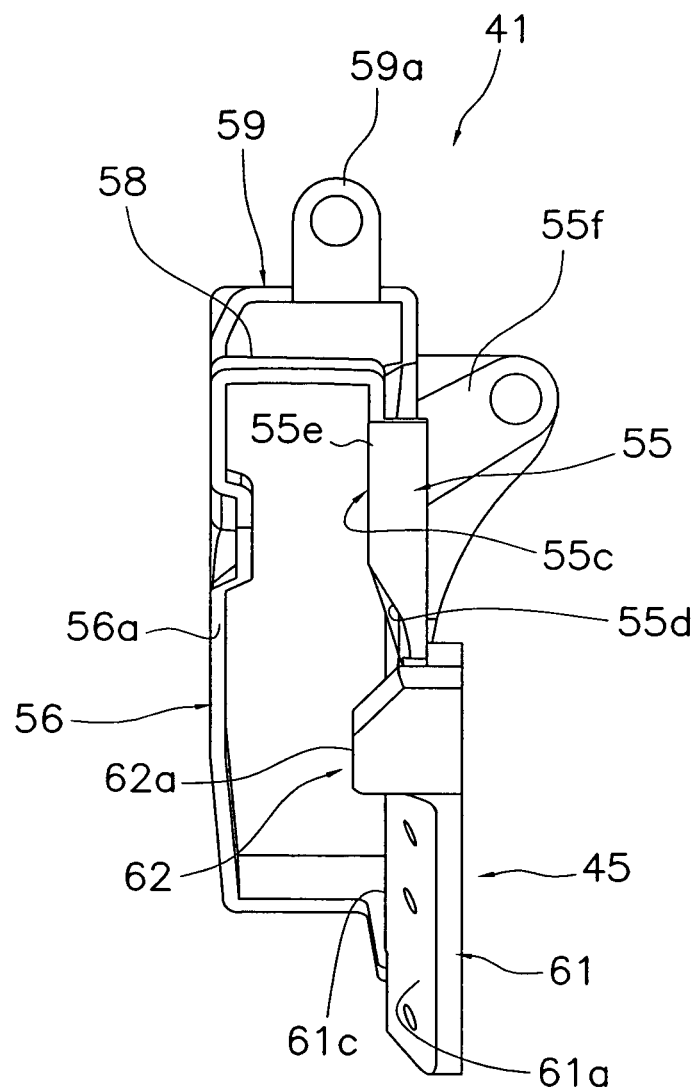
FIG. 6 is a front elevational view of the chain guide and the front derailleur chain detachment prevention member in accordance with the illustrated embodiment of the present invention.

The contacting part 61d is formed in the middle part of the connecting part 61 for contacting and engaging to the inside surface 55h of the inner plate 55, as shown in FIG. 4. The contacting part 61d is provided to regulate the movement in the direction of the outer plate 56 as the front derailleur chain detachment prevention member 45 is forced toward the outer plate 56 by the flat spring 63 and the elasticity of the part itself. Thus, the regulating part 62, which projects farther than the other part by the force exerted by the flat spring 63, approaches the outer plate 56 excessively, and it is difficult for the front derailleur chain detachment prevention member 45 to come into contact with the sprocket F1.

The regulating part 62 is disposed farthest forward, and is thicker than the connecting part 61. The regulating part 62 has a regulating surface 62a configured with a flat, smooth-surfaced tip. The regulating surface 62a is disposed substantially parallel to the chain receiving slot of the chain guide 41, and between the regulating surface 62a and the chain 95 to prevent detachment of the chain 95 from the sprocket F1 toward the inside.

The flat spring 63 is a metal spring member and is installed in an arc-shaped concavity 61e formed in the inside surface of the connecting part 61. The back end of the flat spring 63 is attached to the inner plate 55 by the connecting bolt 57. The flat spring 63 is attached to the concavity 65 by, for example, three hexagon socket head bolts 65. The flat spring 63 is used to press the regulating part 62 toward the inside by the chain 95 in contact with the regulating part 62, and returns to the form when the pressing force is released after the chain detachment protection member 45 is bent to the inside.

In the front derailleur 97f of the above configuration, when downshifting from the top shift position to the low shift position, the chain 95 comes into contact with the inner plate of the chain guide 41, derails from the sprocket F2, and is guided to the sprocket F1. The chain shifting operation of the chain 95 at this time is shown in FIG. 7. When downshifting, as the chain 95 is guided to the sprocket F1, derailment of the chain 95 starts at the detachment point DR disposed in specific rotational phase with the sprocket F2, and the chain 95 drops to the sprocket F1. Since the force needed to derail the chain 95 is greater when downshifting, the regulating surface 62a bends the front derailleur chain detachment prevention member 45 to the inside without retreating even when the chain 95 comes into contact with the regulating surface 62a of the front derailleur chain detachment prevention member 45. Thus, detachment of the chain 95 to the inside is prevented. There is concern that the chain 95 may detach when the front derailleur chain detachment prevention member 45 is bent substantially toward the inside by the chain 95 that comes into contact with the regulating-surface 62a if a weak force is exerted on the front derailleur chain detachment prevention member 45 at this time. Therefore, the flat spring 63 is disposed so as to exert a strong force.

When upshifting from the low position to the top position, the chain 95 first comes into contact with the tapered surface 61a. Since a strong force is needed to derail the chain 95 when upshifting, the front derailleur chain detachment prevention member 45 is pressed with a strong force by the chain 95. Therefore, when the chain 95 first comes into contact with the tapered surface 61a, the chain 95 moves the tapered part 61a forward and rises while sliding on the curved part 61b, such that the entire front derailleur chain detachment prevention member 45 is pressed and bent to the inside. When the chain 95 engages the sprocket F2, the pressure is released, and the front derailleur chain detachment prevention member 45 returns to the original contact point at which the contacting part 61d contacts the inside surface 55h of the inner plate 55 via the force exerted by the front derailleur chain detachment prevention member 45 itself and the force of the flat spring 63. Although the contact position of the chain 95 and chain guide 41 gradually moves forward when upshifting, the chain 95 moves smoothly without binding on the connecting part 61 because the connecting part 61 is provided with the tapered part 61a that has the curvature 61b.

At this time, since the mounting part 60 of the front derailleur chain detachment prevention member 45 is mounted on the inner plate 55 by the connecting bolt 57, the front derailleur chain detachment prevention member 45 can be easily removed from the inner plate 55 when replacing it with a different shaped front derailleur chain detachment prevention member 45 depending on the different of the number of gear teeth.

Since the connecting part 61 is disposed along the bottom edge of the inner plate 55, the parts of the front derailleur chain detachment prevention member 45 other than the regulating part 62 can be disposed at positions separated from the outer plate 56 or on the same plane as the outside surface of the inner plate 55, and the bottom edge can be disposed outward in the diameter direction of the small diameter sprocket F1 even when the chain guide 41 is disposed at the large diameter sprocket F2. Therefore, the front derailleur chain detachment prevention member 45 does not come into contact with the small diameter sprocket F1 even when the chain guide 41 is disposed at the large diameter sprocket F2.

Although a flat spring 63 is provided to strengthen the exerted force in the above embodiment, a flat spring need not be provided if the front derailleur chain detachment prevention member has elasticity throughout. For example, a flat spring need not be provided when the front derailleur chain detachment prevention member itself has a strong exerted force.

Although the flat spring 63 is attached to the inner plate 55 by a connecting bolt 57 in the above embodiment, the flat spring may also be attached to the connecting part alone. Furthermore, the mounting part can be provided on a flat spring, and the connecting part and regulating part may be attached to the flat spring.

Although the contacting part is provided in the middle part of the connecting part in the above embodiment, the position of the contacting part may be any position insofar as the position contacts the inside surface of the inner plate.

Although the front derailleur chain detachment prevention member is formed of synthetic resin except for the flat spring in the above embodiment, the member may also be formed of an elastic metal. In this case, the surface layer of synthetic resin may be formed by insert molding or the like to provide good slidability for the parts that come into contact with the chain.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, front, back, above, up, down, downward, vertical, horizontal, below and transverse" as well as any other similar directional terms refer to those directions of a bicycle equipped with the present invention. The directional terms "left" and "right" refer to those directions of a bicycle when viewing the bicycle from the back. The directional terms "inside" and "outside" refer to those directions such that the inside or inner side is nearest the frame, and the outside or outer side is farthest from the frame when mounted on a bicycle. Accordingly, these directional terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claim. Furthermore, the foregoing descriptions of the embodiments according to the present invention are provided for illustration only, and not for the purpose of limiting the invention as defined by the appended claim and their equivalents.

What is claimed is:

1. A front derailleur chain detachment prevention member comprising:
    a mounting part configured and arranged to be detachable and reinstallable to an inner plate of a chain guide of a front derailleur at a mounting point of the mounting part that connects the mounting part to the chain guide;
    a connecting part having a rearward end coupled to the mounting part and a forward end located forwardly from the mounting part, the connecting part having a length from the rearward end to the forward end in a lengthwise direction of a bicycle frame with respect to a center axis of a seat tube of the bicycle frame when the front derailleur is mounted to the bicycle frame, the length of the connecting part extending along a majority of the inner plate with a tip of the forward end of the connecting part being cantilevered relative to the mounting point of the mounting part when installed on the chain guide of the front derailleur to be resiliently supported such that the majority of the length of the connecting part is laterally deflectable relative to the mounting point of the mounting part with deflection of the connecting part relative to the chain guide occurring adjacent the mounting point of the mounting part;
    a regulating part disposed at the tip of the forward end of the connecting part and the regulating part projecting outwardly from the connecting part in a lateral direction from the inner plate toward an outer plate of the chain guide when the front derailleur chain detachment prevention member is installed on the chain guide of the front derailleur; and
    a force exerting member configured and arranged as an elastic body that exerts a force on the regulating part toward the outer plate.

2. The front derailleur chain detachment prevention member as set forth in claim 1, wherein
    each of the mounting part, the connecting part, and the regulating part includes a synthetic resin chain contacting part having a low coefficient of friction relative to metal.

3. The front derailleur chain detachment prevention member as set forth in claim 1, wherein
    the connecting part is configured and arranged to be disposed along a bottom edge of the inner plate such that the connecting part is disposed outward in a radial direction from an outermost diameter position of a smallest stage sprocket on a small diameter side when installed on the chain guide of the front derailleur with a chain receiving slot of the front derailleur being disposed over a largest stage sprocket on a large diameter side.

4. The front derailleur chain detachment prevention member as set forth in claim 1, wherein
    the force exerting member is a flat spring.

5. The front derailleur chain detachment prevention member as set forth in claim 1, further comprising
    a contacting part disposed on the connecting part that contacts the inner plate in a rest position of the connecting part to regulate movement in a direction of the outer plate of the chain guide.

6. The front derailleur chain detachment prevention member as set forth in claim 1, wherein
    the mounting part includes a connecting bolt that is configured and arranged to fixedly attach to the inner plate and the outer plate together as well as mount the front derailleur chain detachment prevention member to the inner plate.

7. The front derailleur chain detachment prevention member as set forth in claim 1, wherein
    the regulating part has a flat surface disposed substantially parallel to a chain receiving slot defined by the inner and outer plates when the front derailleur chain detachment prevention member is installed on the chain guide of the front derailleur.

8. The front derailleur chain detachment prevention member as set forth in claim 1, wherein
    the connecting part has a tapered part that is inclined to slope downwardly and away from a chain receiving slot defined by the inner and outer plates when the front derailleur chain detachment prevention member is installed on the chain guide of the front derailleur.

9. The front derailleur chain detachment prevention member as set forth in claim 8, wherein
    the tapered part has a curvature that curves smoothly toward the regulating part.

10. A front derailleur comprising:
    a fixed member configured and arranged to be fixedly attached to a bicycle;

a chain guide configured to move between a retracted position and an extended position relative to the fixing member, the chain guide having an inner plate and an outer plate defining a chain receiving slot;

a linkage assembly coupled between the fixing member and the chain guide in order to move the chain guide between the retracted position and the extended position; and a front derailleur chain detachment prevention member coupled to the inner plate of the chain guide, the front derailleur chain detachment prevention member comprising a mounting part coupled to the inner plate of the chain guide at a mounting point of the mounting part that connects the mounting part to the chain guide;

a connecting part having a rearward end coupled to the mounting part and a forward end located forwardly from the mounting part, the connecting part having a length from the rearward end to the forward end in a lengthwise direction of a bicycle frame with respect to a center axis of a seat tube of the bicycle frame when the front derailleur is mounted to the bicycle frame, the length of the connecting part extending along the majority of the inner plate with a tip of the forward end of the connecting part being cantilevered relative to the mounting point of the mounting part to be resiliently supported such that the majority of the length of the connecting part is laterally deflectable relative to the mounting point of the mounting part with deflection of the connecting part relative to the chain guide occurring adjacent the mounting point of the mounting part; and a regulating part disposed at the tip of the forward end of the connecting part and the regulating part projecting outwardly from the connecting part in a lateral direction from the inner plate toward an outer plate of the chain guide.

11. The front derailleur as set forth in claim 10, wherein each of the mounting part, the connecting part, and the regulating part includes a synthetic resin chain contacting part having a low coefficient of friction relative to metal.

12. The front derailleur as set forth in claim 10, wherein the connecting part is configured and arranged to be disposed along a bottom edge of the inner plate such that the connecting part is disposed outward in a radial direction from an outermost diameter position of a smallest stage sprocket on a small diameter side when installed the chain receiving slot of the front derailleur is disposed over a largest stage sprocket on a large diameter side.

13. The front derailleur as set forth in claim 10, wherein the front derailleur chain detachment prevention member further comprises a force exerting member that is configured and arranged as an elastic body that exerts a force on the regulating part toward the outer plate.

14. The front derailleur as set forth in claim 13, wherein the force exerting member is a flat spring.

15. The front derailleur as set forth in claim 10, wherein the front derailleur chain detachment prevention member further comprises a contacting part disposed on the connecting part to contact the inner plate.

16. The front derailleur as set forth in claim 10, wherein the mounting part and the inner and outer plates are fixedly attached together by a connecting bolt.

17. The front derailleur as set forth in claim 10, wherein the regulating part has a flat surface disposed substantially parallel to the chain receiving slot.

18. The front derailleur as set forth in claim 10, wherein the connecting part has a tapered part that is inclined to slope downwardly and away from the chain receiving slot.

19. The front derailleur as set forth in claim 18, wherein the tapered part has a curvature that curves smoothly toward the regulating part.

\* \* \* \* \*